US010612653B2

(12) United States Patent
Yagasaki et al.

(10) Patent No.: US 10,612,653 B2
(45) Date of Patent: Apr. 7, 2020

(54) METAL ELEMENT FOR CONTINUOUSLY VARIABLE TRANSMISSION AND METHOD OF MANUFACTURING METAL ELEMENT FOR CONTINUOUSLY VARIABLE TRANSMISSION

(71) Applicant: Honda Motor Co., Ltd., Tokyo (JP)

(72) Inventors: Toru Yagasaki, Saitama (JP); Soichiro Sumida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 15/802,414

(22) Filed: Nov. 2, 2017

(65) Prior Publication Data

US 2018/0128370 A1    May 10, 2018

(30) Foreign Application Priority Data

Nov. 4, 2016  (JP) ................... 2016-215901

(51) Int. Cl.
| | | |
|---|---|---|
| *F16H 61/662* | (2006.01) | |
| *B21D 53/14* | (2006.01) | |
| *F16G 5/16* | (2006.01) | |
| *F16H 9/04* | (2006.01) | |

(52) U.S. Cl.
CPC .......... *F16H 61/662* (2013.01); *B21D 53/14* (2013.01); *F16G 5/16* (2013.01); *F16H 9/04* (2013.01)

(58) Field of Classification Search
CPC . F16G 5/16; F16G 5/163; B21D 53/14; F16H 9/125; B21K 23/00
USPC ...................................................... 474/242
See application file for complete search history.

(56) References Cited

U.S. PATENT DOCUMENTS

| | | | | | |
|---|---|---|---|---|---|
| 4,826,473 A | * | 5/1989 | Miyawaki | ................. | F16G 5/16 474/240 |
| 5,154,675 A | * | 10/1992 | Roovers | ................... | F16G 5/16 474/242 |
| 5,346,440 A | * | 9/1994 | Smeets | ..................... | F16G 5/16 474/242 |
| 5,374,223 A | * | 12/1994 | Hendriks | ................. | F16G 5/16 474/242 |
| 6,074,317 A | * | 6/2000 | Kobayashi | ............... | F16G 5/16 474/201 |
| 6,332,854 B1 | * | 12/2001 | Kanokogi | ................ | F16G 5/16 474/201 |

(Continued)

FOREIGN PATENT DOCUMENTS

JP          4129448          8/2008

*Primary Examiner* — Henry Y Liu
(74) *Attorney, Agent, or Firm* — JCIPRNET (57) ABSTRACT

A rear surface of a metal element (23) includes first contact portions (C1) formed on both right and left end sides of an ear portion (26), a second contact portion (C2) formed in a neck portion (25), and a third contact portion (C3) formed in a central portion in a transverse direction in the vicinity of a locking edge (29) of a body portion (24). The first contact portions (C1), the second contact portion (C2), and the third contact portion (C3) can come into contact with a front surface of another adjacent metal element (23) on a rear side. A plate thickness of the metal element (23) in the second contact portion (C2) is smaller than the plate thickness of the metal element (23) in the first contact portions (C1) and is greater than the plate thickness of the metal element (23) in the third contact portion (C3).

2 Claims, 13 Drawing Sheets

(56) References Cited

U.S. PATENT DOCUMENTS

| | | | | |
|---|---|---|---|---|
| 6,336,884 B1* | 1/2002 | Wakui | F16G 5/16 | 474/201 |
| 6,409,620 B1* | 6/2002 | Yoshida | F16G 5/16 | 474/201 |
| 6,440,025 B1* | 8/2002 | Ohnuki | F16G 5/16 | 474/242 |
| 6,565,469 B1* | 5/2003 | Aoyama | F16G 5/16 | 474/240 |
| 6,578,249 B2* | 6/2003 | Fujioka | F16G 5/16 | 29/428 |
| 6,599,212 B2* | 7/2003 | Kanokogi | F16G 5/16 | 474/201 |
| 6,645,104 B2* | 11/2003 | Suzuki | B21D 53/14 | 474/201 |
| 6,652,403 B2* | 11/2003 | Drees | F16G 5/16 | 474/201 |
| 6,672,984 B2* | 1/2004 | Yagasaki | F16G 5/16 | 474/201 |
| 6,705,963 B2* | 3/2004 | Smeets | F16G 5/16 | 474/201 |
| 6,708,383 B2* | 3/2004 | Arikawa | F16G 5/16 | 29/407.05 |
| 6,739,995 B2* | 5/2004 | Okada | F16G 5/16 | 474/201 |
| 6,755,760 B2* | 6/2004 | Akagi | F16G 5/16 | 474/201 |
| 6,821,224 B2* | 11/2004 | Van Dijnsen | F16G 5/16 | 474/201 |
| 6,832,967 B2* | 12/2004 | Kanokogi | F16G 5/16 | 474/201 |
| 6,843,743 B2* | 1/2005 | Aoyama | F16G 5/16 | 474/242 |
| 6,857,980 B2* | 2/2005 | van Liempd | F16G 5/16 | 474/242 |
| 6,896,633 B2* | 5/2005 | Kanehara | F16G 5/16 | 474/201 |
| 6,951,124 B2* | 10/2005 | Kanamaru | B21D 53/14 | 474/242 |
| 7,077,775 B2* | 7/2006 | Shiba | F16G 5/16 | 474/201 |
| 7,097,581 B2* | 8/2006 | Inukai | F16G 5/166 | 474/242 |
| 7,169,071 B2* | 1/2007 | Miura | F16G 5/16 | 474/242 |
| 7,201,689 B2* | 4/2007 | Van Der Meer | F16G 5/16 | 474/201 |
| 7,217,209 B2* | 5/2007 | Saito | F16H 9/125 | 474/201 |
| 7,282,002 B2* | 10/2007 | Kanehara | F16G 5/16 | 474/201 |
| 7,294,077 B2* | 11/2007 | Wang | F16G 5/16 | 156/137 |
| 7,846,049 B2* | 12/2010 | Kanehara | F16G 5/16 | 474/201 |
| 7,867,121 B2* | 1/2011 | Yagasaki | F16G 5/16 | 474/201 |
| 7,892,126 B2* | 2/2011 | van Lith | F16G 5/163 | 474/201 |
| 7,963,873 B2* | 6/2011 | Kobayashi | F16G 5/16 | 474/201 |
| 8,100,797 B2* | 1/2012 | Prinsen | B21D 53/14 | 474/201 |
| 8,814,735 B2* | 8/2014 | Toyohara | F16G 5/16 | 474/242 |
| 8,944,946 B2* | 2/2015 | Baba | F16G 5/16 | 474/201 |
| 9,080,639 B2* | 7/2015 | Harima | F16G 5/16 | |
| 9,714,690 B2* | 7/2017 | Yagasaki | F16G 5/16 | |
| 9,772,005 B2* | 9/2017 | Yagasaki | F16G 5/16 | |
| 10,094,446 B2* | 10/2018 | Yagasaki | F16G 5/16 | |

* cited by examiner

METAL ELEMENT FOR CONTINUOUSLY VARIABLE TRANSMISSION AND METHOD OF MANUFACTURING METAL ELEMENT FOR CONTINUOUSLY VARIABLE TRANSMISSION

CROSS-REFERENCE TO RELATED APPLICATION

This application claims the priority benefit of Japan application serial no. 2016-215901, filed on Nov. 4, 2016. The entirety of the above-mentioned patent application is hereby incorporated by reference herein and made a part of this specification.

BACKGROUND OF THE INVENTION

Field of the Invention

The present invention relates to a metal element for a continuously variable transmission including a metal belt comprising a pair of metal rings for supporting a plurality of the metal elements in the continuously variable transmission, and a manufacturing method of manufacturing a metal element for a continuously variable transmission thereof.

Description of Related Art

Patent Document 1 discloses a metal element. In order to suppress pitching of metal elements which come into contact with each other in a chord portion of a metal belt of a belt-type continuously variable transmission on a driving force transmitting side, and to enhance the rigidity of the metal belt, contact portions which can come into contact with a front surface of an adjacent metal element are respectively formed in both end portions of an ear portion in a transverse direction, a neck portion, and a central portion of a locking edge portion in the transverse direction on a rear surface of the metal element.

Patent Document 1 describes that, in order to suppress pitching of the metal element, an outer end of the contact portion of the neck portion in a radial direction is positioned radially outward from an inner end of the contact portion of the ear portion in the radial direction, and the contact portion of the neck portion and the contact portion of the locking edge portion are required to have a step therebetween.

PRIOR ART DOCUMENT

Patent Documents

[Patent Document 1] Japanese Patent No. 4129448

SUMMARY OF THE INVENTION

Figure 13:
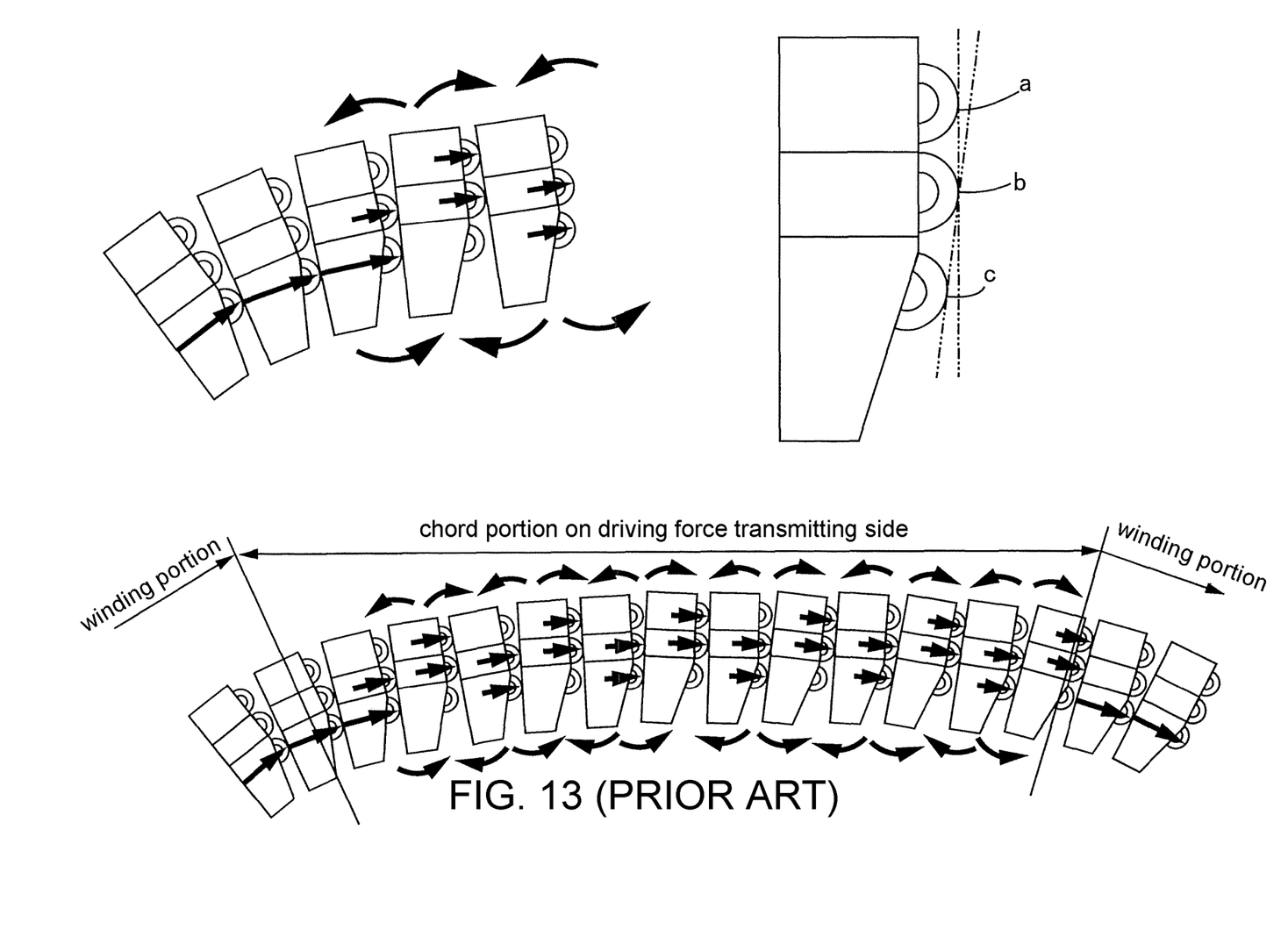
FIG. 13 is a view describing behavior of the metal element in a chord portion on a driving force transmitting side (example in the related art).

However, in metal elements in the related art, as illustrated in FIG. 13, a contact portion b of a neck portion protrudes rearward to the farthest extent from a rear surface of the metal element. Accordingly, when a contact portion a of an ear portion and the contact portion b of the neck portion come into contact with an adjacent metal element due to front-up pitching of the metal element, a contact portion c of a locking edge portion is separated from the adjacent metal element. On the other hand, when the contact portion c of the locking edge portion and the contact portion b of the neck portion come into contact with an adjacent metal element due to front-down pitching of the metal element, the contact portion a of the ear portion is separated from the adjacent metal element. Therefore, there is a possibility that the adjacent metal elements will pitch in directions opposite to each other, the rigidity of a chord portion of a metal belt on a driving force transmitting side will deteriorate, and the efficiency of transmitting power will be degraded.

The present invention has been made in consideration of the foregoing circumstances, and the present invention suppresses pitching of a metal element in a chord portion of a metal belt on a driving force transmitting side and reduces a press load when a metal element raw material is subjected to pressing and a metal element is manufactured.

The invention disclosed in claim 1 proposes a metal element for a continuously variable transmission including a metal belt comprising a pair of metal rings for supporting a plurality of the metal elements in the continuously variable transmission. The metal element includes a pair of right and left ring slots into which the pair of metal rings are fitted, a neck portion which is positioned between the pair of ring slots, an ear portion which extends radially outward from the neck portion, and a body portion which extends radially inward from the neck portion and has saddle surfaces being formed to support inner circumferential surfaces of the metal rings. A locking edge extending in a transverse direction and an inclined surface extending radially inward and rearward from the locking edge are formed on a front surface of the body portion. A rear surface of the metal element includes a pair of first right and left contact portions which are respectively formed on both right and left end sides of the ear portion, a second contact portion which is formed in the neck portion, and a third contact portion formed in a central portion in the transverse direction in the vicinity of the locking edge of the body portion. The first contact portions, the second contact portion, and the third contact portion are able to come into contact with a front surface of another adjacent metal element on a rear side in a chord portion of the metal belt on a driving force transmitting side. A plate thickness of the metal element in the second contact portion is smaller than the plate thickness of the metal element in the first contact portions and is greater than the plate thickness of the metal element in the third contact portion.

In addition, the invention disclosed in claim 2 proposes a method of manufacturing a metal element for a continuously variable transmission, in which the metal element according to claim 1 is manufactured through pressing of a belt plate-shaped metal element raw material having a constant cross section by dies. A first recess portion which is formed through pressing is provided in a central portion of the ear portion surrounded by the pair of first right and left contact portions and the second contact portion on the rear surface of the metal element, and a second recess portion which is configured by a groove-shaped raw material recess portion formed in the metal element raw material in advance is provided in an inner end portion of the ear portion in a radial direction.

A counter punch 47 and a main punch 49 in the embodiment correspond to the dies in the present invention.

According to the configuration of claim 1, a rear surface of a metal element includes a pair of first right and left contact portions which are formed on both right and left end sides of an ear portion, a second contact portion which is formed in a neck portion, and a third contact portion which is formed in a central portion in a transverse direction in the vicinity of a locking edge of a body portion. The first contact portions, the second contact portion, and the third contact portion can come into contact with a front surface of another adjacent metal element on a rear side. A plate thickness of the metal element in the second contact portion is smaller than the plate thickness of the metal element in the first contact portions and is greater than the plate thickness of the metal element in the third contact portion. Accordingly, the second contact portion does not protrude rearward with respect to the first contact portions and the third contact portion. Therefore, the first contact portions, the second contact portion, and the third contact portion are positioned within substantially the same plane. As a result, the first contact portions, the second contact portion, and the third contact portion come into contact with a front surface of an adjacent metal element in a chord portion of a metal belt on a driving force transmitting side in a substantially even manner. Therefore, pitching of the metal element is suppressed and the rigidity of the metal belt is enhanced, and thus, the efficiency of transmitting power is improved.

In addition, according to the configuration of claim 2, the metal element is manufactured through pressing of a belt plate-shaped metal element raw material having a constant cross section by dies. A first recess portion which is formed through pressing is provided in a central portion of the ear portion surrounded by the pair of first right and left contact portions and the second contact portion on the rear surface of the metal element, and a second recess portion which is configured by a groove-shaped raw material recess portion formed in the metal element raw material in advance is provided in an inner end portion of the ear portion in a radial direction. Therefore, a part of the material pushed out from the first recess portion due to a press load of the dies moves into the second recess portion configured by a groove-shaped raw material recess portion formed in the metal element raw material in advance, and thus, the press load is reduced and the durability of the dies is improved.

DESCRIPTION OF THE EMBODIMENTS

First Embodiment

Hereinafter, a first embodiment of the present invention will be described based on FIGS. 1 to 10.

Figure 1:
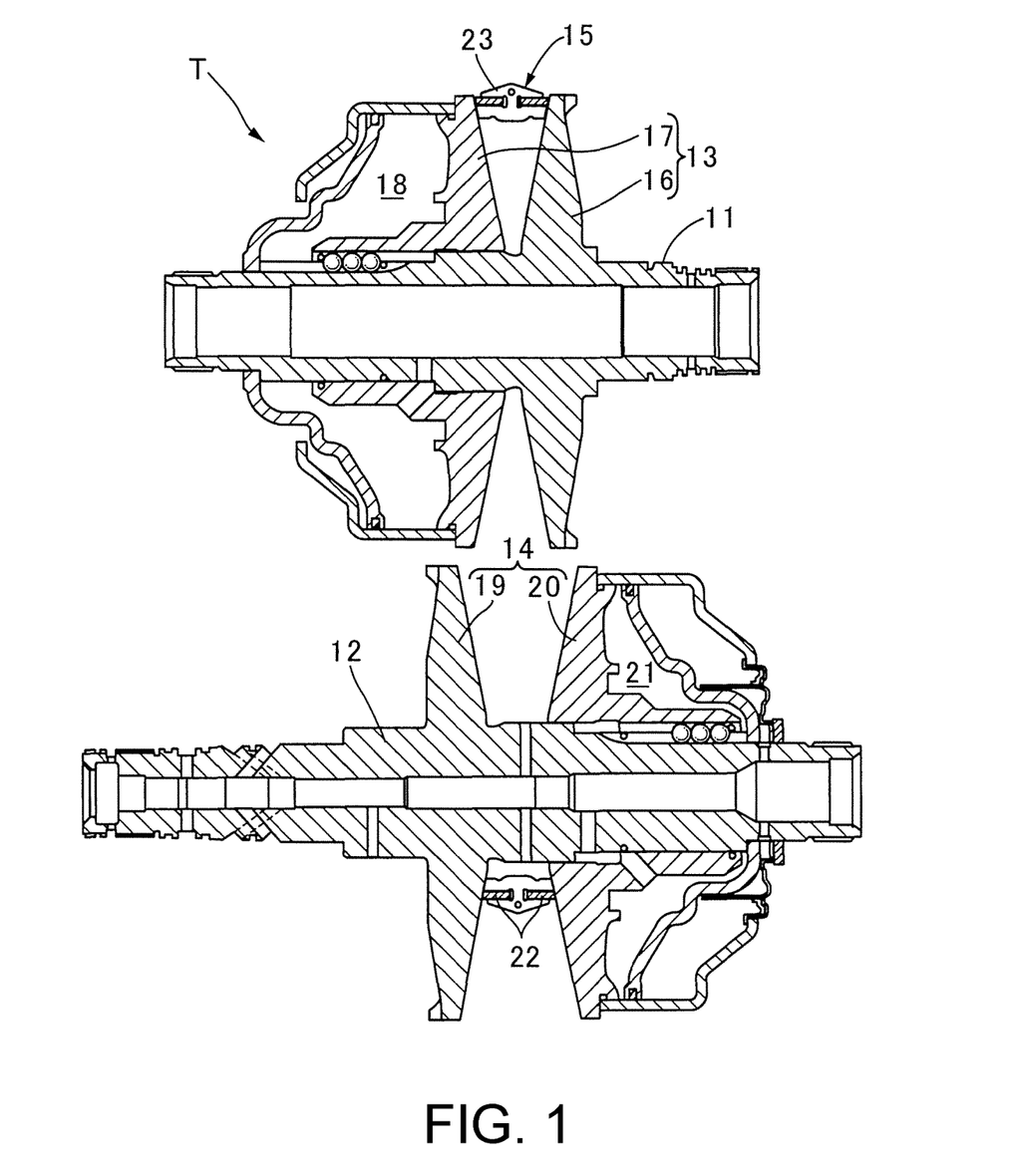
FIG. 1 is a view illustrating the overall configuration of a belt-type continuously variable transmission (first embodiment).

FIG. 1 illustrates a schematic structure of a belt-type continuously variable transmission T mounted in an automobile. The belt-type continuously variable transmission T includes a drive shaft 11 which is connected to an engine and a driven shaft 12 which is connected to driving wheels. An endless metal belt 15 is wound around a drive pulley 13 which is provided in the drive shaft 11 and a driven pulley 14 which is provided in the driven shaft 12. The drive pulley 13 includes a fixed side pulley half 16 which is fixed to the drive shaft 11 and a movable side pulley half 17 which can come into contact with and be separated from the fixed side pulley half 16. The movable side pulley half 17 is biased toward the fixed side pulley half 16 due to oil pressure acting on an oil chamber 18. The driven pulley 14 includes a fixed side pulley half 19 which is fixed to the driven shaft 12 and a movable side pulley half 20 which can come into contact with and be separated from the fixed side pulley half 19. The movable side pulley half 20 is biased toward the fixed side pulley half 19 due to oil pressure acting on an oil chamber 21.

Figures 2A, 2B:
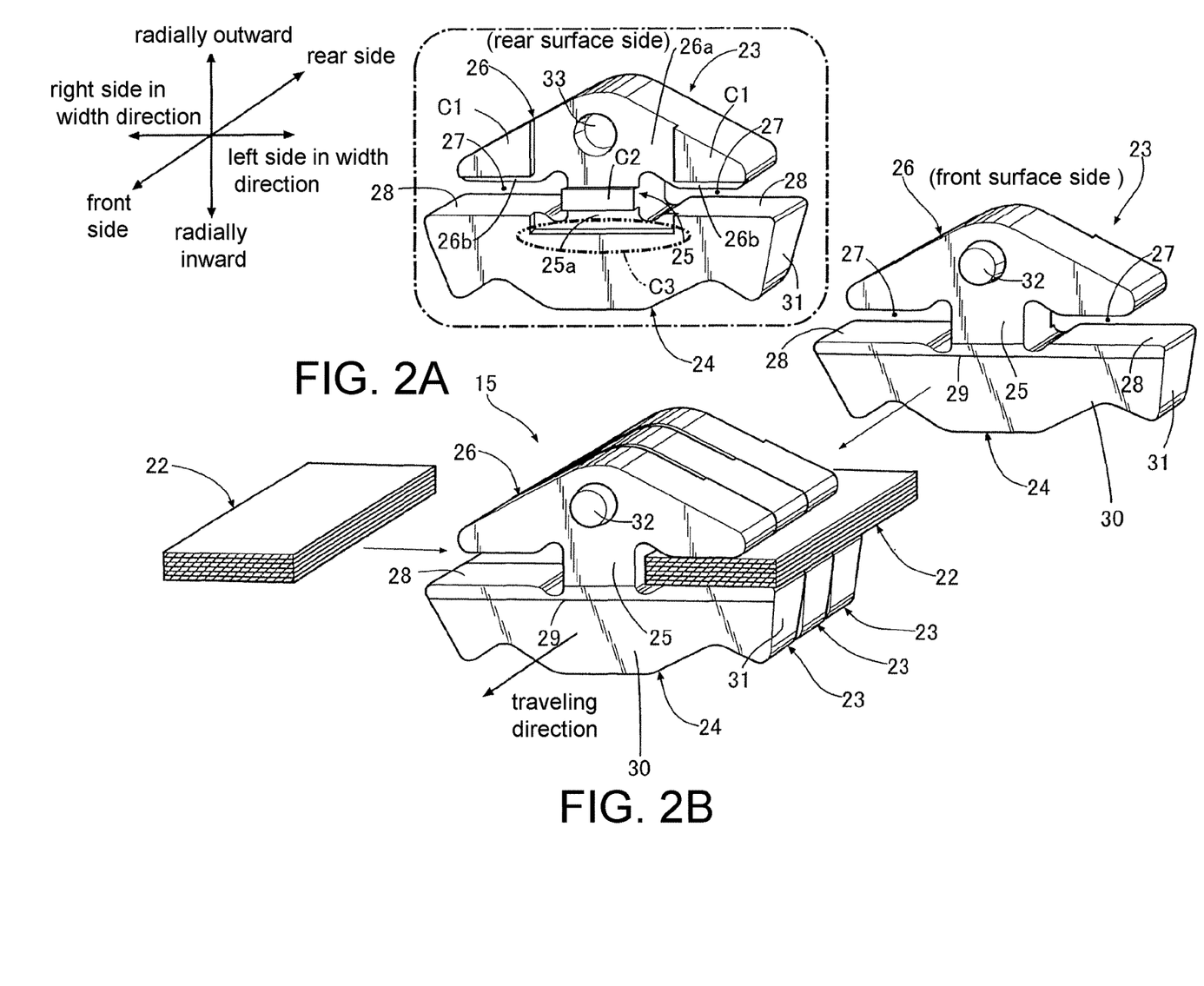
FIGS. 2A and 2B are perspective views of a metal belt and a metal element (first embodiment).
Figure 3:
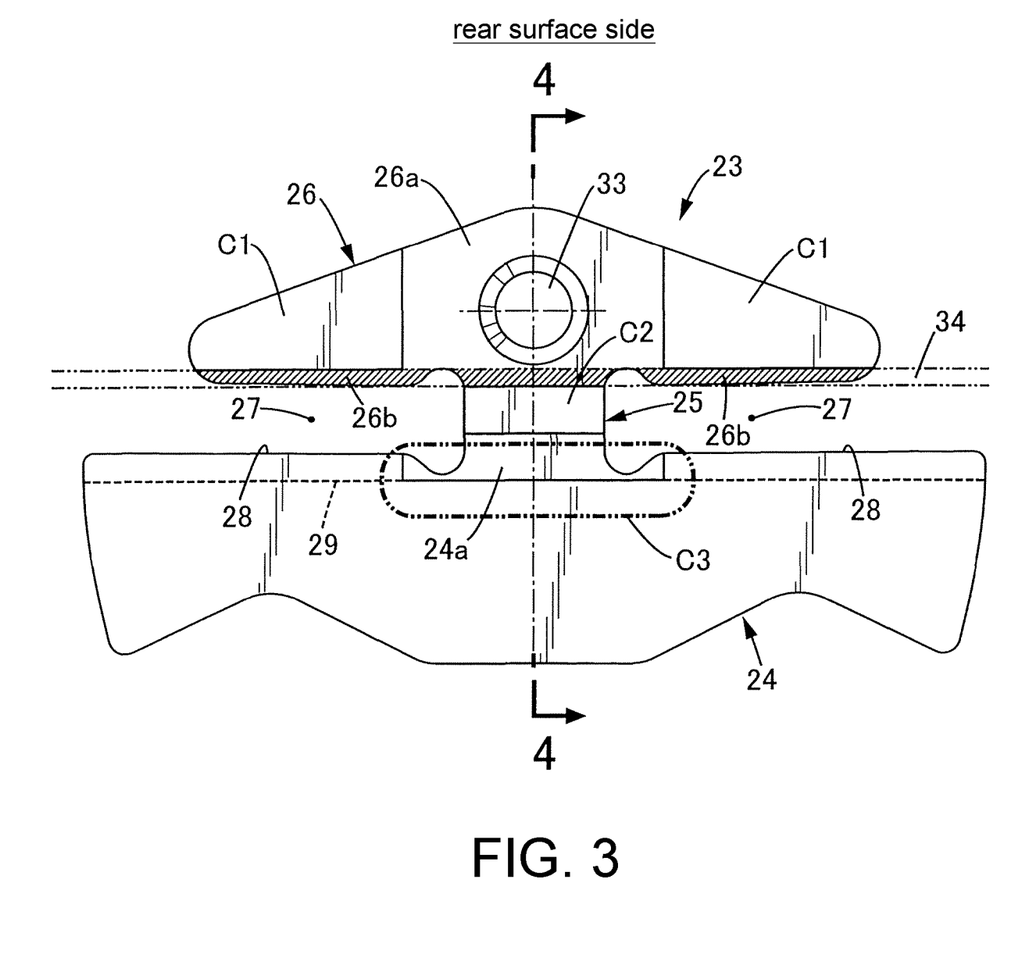
FIG. 3 is a rear view of the metal element (first embodiment).
Figure 4:
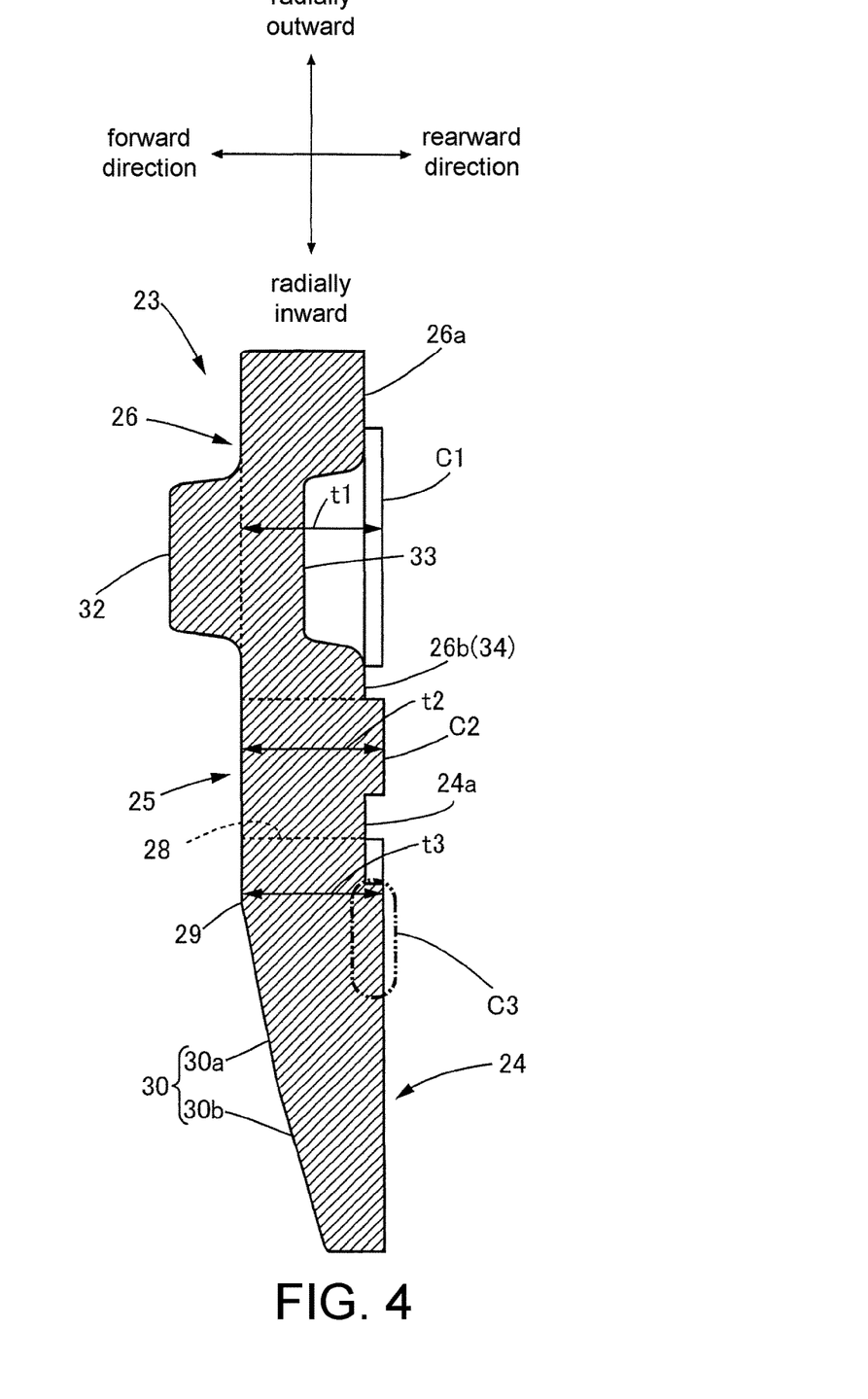
FIG. 4 is a cross-sectional view taken along line 4-4 in FIG. 3 (first embodiment).

As illustrated in FIGS. 2A to 2B to 4, the metal belt 15 has a configuration in which a pair of right and left metal rings 22 are each supported by a number of metal elements 23. In this specification, a direction in which the metal belt 15 travels is defined as the forward direction in the forward-rearward direction. The outer circumferential sides of the drive pulley 13 and the driven pulley 14 in a state in which the metal belt 15 is wound around the drive pulley 13 and the driven pulley 14 are defined as the outsides in the radial direction. A direction orthogonal to the forward-rearward direction and the radial direction is defined as the transverse direction. In addition, in regard to a metal element raw material 23' (refer to FIG. 5) which serves as a raw material for the metal element 23 and a punching apparatus 41 (refer to FIGS. 6A and 6B) which punches the metal element raw material 23' and forms the metal element 23, directions corresponding to the forward-rearward direction, the radial direction, and the transverse direction of the metal element 23 are respectively defined as the forward-rearward direction, the radial direction, and the transverse direction thereof.

The metal element 23 manufactured from the metal element raw material 23' includes a body portion 24 which extends in the transverse direction, a neck portion 25 which extends radially outward from the center of the body portion 24 in the transverse direction, and a substantially triangular ear portion 26 which is connected to an outer end of the neck portion 25 in the radial direction. A pair of ring slots 27, which are open outward in the transverse direction and in each of which the metal ring 22 is fitted, are each formed between the body portion 24, the neck portion 25, and the ear portion 26. Saddle surfaces 28, on each of which the inner circumferential surface of the metal ring 22 is seated, are formed at the outer ends of the body portion 24 in the radial direction facing the ring slots 27. The locking edge 29 extending in the transverse direction is formed on the front surface of the body portion 24 radially inward from the saddle surface 28. Moreover, an inclined surface 30 inclining radially inward and rearward from the locking edge 29 is formed on the front surface of the body portion 24.

Pulley contact surfaces 31 in contact with V-surfaces of the drive pulley 13 and the driven pulley 14 are formed at both the right and left ends of the body portion 24 of the metal element 23. In addition, a truncated cone-shaped nose 32, which can be fitted into a truncated cone-shaped hole 33 formed on the rear surface of the ear portion 26, is formed on the front surface of the ear portion 26 of the metal element 23.

The inclined surface 30 of the metal element 23 is constituted by a first inclined surface 30a which inclines radially inward and rearward from the locking edge 29 at a first inclination angle θ1 and a second inclined surface 30b which inclines radially inward and rearward from an inner end of the first inclined surface 30a in the radial direction at a second inclination angle θ2. The plate thickness of the body portion 24 in the forward-rearward direction becomes gradually thinner radially inward within the range of the inclined surface 30.

As seen in FIG. 3, a first flat recess portion 26a surrounding the hole 33 of the ear portion 26 is formed on the rear surface of the metal element 23. A second flat recess portion 26b (refer to shaded portion) is formed continuously in the transverse direction along the inner end of the ear portion 26 in the radial direction. Moreover, a third flat recess portion 24a is formed in a portion radially outward from the locking edge 29 in a central portion of the body portion 24 of the metal element 23 in the transverse direction. As a result, a pair of first right and left contact portions C1 positioned on both right and left end sides of the ear portion 26, a second contact portion C2 positioned in the neck portion 25, and a third contact portion C3 positioned in the vicinity of the locking edge 29 in the central portion of the body portion 24 in the transverse direction are formed on the rear surface of the metal element 23. The third contact portion C3 and another portion of the body portion 24 on the rear surface are plane. However, a predetermined position of the body portion 24 on the rear surface is defined as the third contact portion C3. The first contact portions C1, the second contact portion C2, and the third contact portion C3 are on the flat rear surface of the metal element 23 excluding the first recess portion 26a, the second recess portion 26b, and the third recess portion 24a. Therefore, the rearward protrusion heights thereof are uniform.

As seen in FIG. 4, the plate thicknesses in the forward-rearward direction of the first contact portions C1, the second contact portion C2, and the third contact portion C3 of the metal element 23 are not uniform but are slightly different from each other. A plate thickness t1 of each first contact portion C1 of the ear portion 26 positioned radially outward is the largest, a plate thickness t2 of the second contact portion C2 of the neck portion 25 positioned in the middle in the radial direction is the second largest, and a plate thickness t3 of the third contact portion C3 in the vicinity of the locking edge 29 positioned radially inward is the smallest. That is, the thicknesses are set in a manner of the plate thickness t1 of the first contact portions C1>the plate thickness t2 of the second contact portion C2>the plate thickness t3 of the third contact portion C3.

Figure 5:
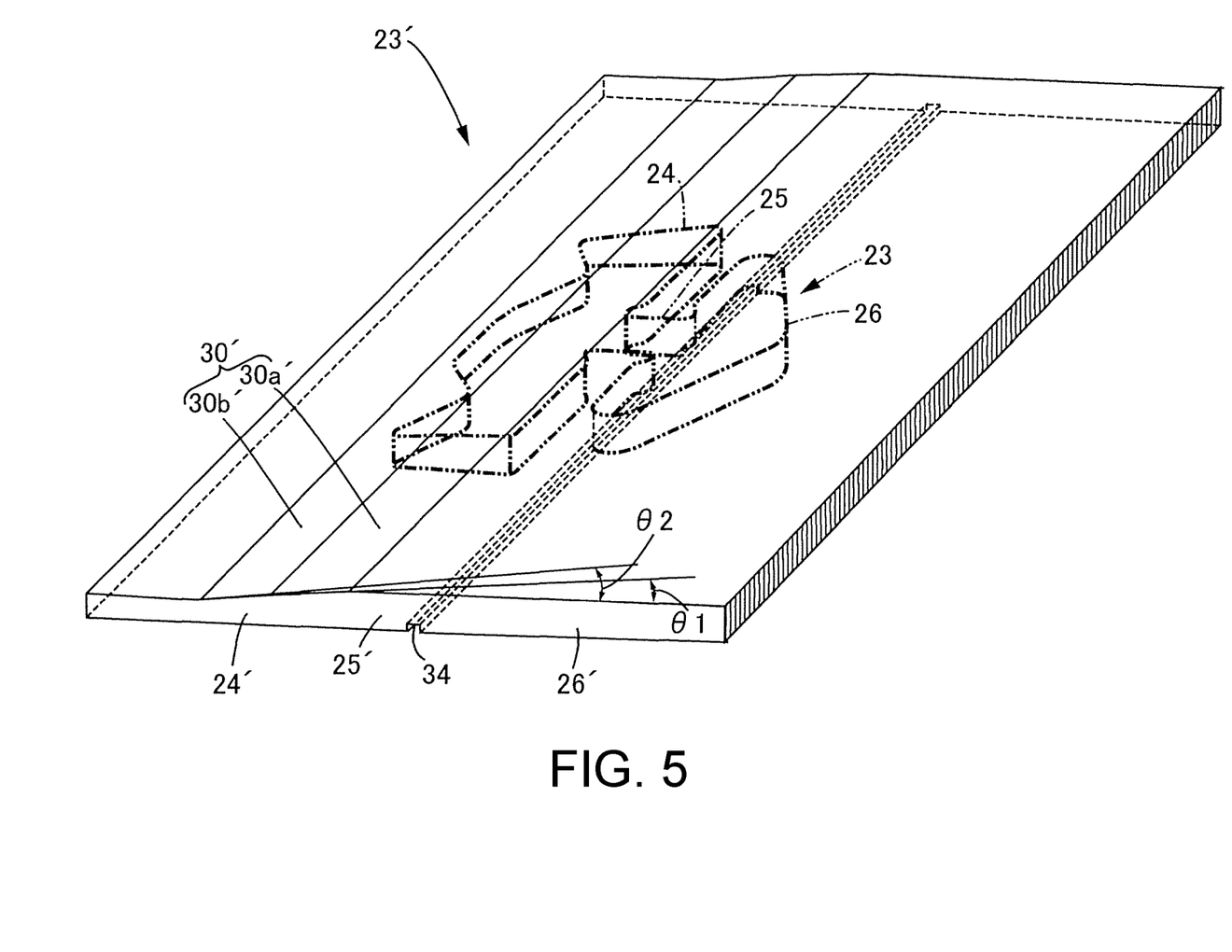
FIG. 5 is a perspective view of a metal element raw material (first embodiment).

As illustrated in FIG. 5, the metal element raw material 23' which serves as a raw material when the metal element 23 is manufactured is made of a belt-shaped metal plate which is subjected to rolling such that the metal plate has a constant cross section in a longitudinal direction. The metal element raw material 23' includes an ear portion corresponding portion 26', a neck portion corresponding portion 25', and a body portion corresponding portion 24' respectively corresponding to the ear portion 26, the neck portion 25, and the body portion 24 of the metal element 23. A raw material recess portion 34 extending in a groove shape along the metal element raw material 23' in the longitudinal direction is formed at the inner end in the radial direction on the rear surface of the ear portion corresponding portion 26' of the metal element raw material 23'. The raw material recess portion 34 corresponds to the second recess portion 26b of the ear portion 26 of the metal element 23.

In addition, the body portion corresponding portion 24' of the metal element raw material 23' has a plate thickness which is substantially the same as the plate thickness t3 of the third contact portion C3 of the body portion 24 at a position corresponding to the locking edge 29, and the plate thickness decreases radially inward therefrom. That is, an inclined surface corresponding portion 30' of the body portion corresponding portion 24' of the metal element raw material 23' is constituted by a first inclined surface corresponding portion 30a' which inclines radially inward and rearward from a locking edge corresponding portion 29' at the first inclination angle θ1, and a second inclined surface corresponding portion 30b' which inclines radially inward and rearward from the inner end of the first inclined surface corresponding portion 30a' in the radial direction at the second inclination angle θ2.

As described above, the cross-sectional shape of the metal element raw material 23' substantially coincides with the cross-sectional shape of the metal element 23 except that the metal element raw material 23' does not have the nose 32 and the hole 33 of the metal element 23, a portion corresponding to the first recess portion 26a of the ear portion 26 of the metal element 23, and a portion corresponding to the third recess portion 24a of the body portion 24 of the metal element 23.

Figure 6A:
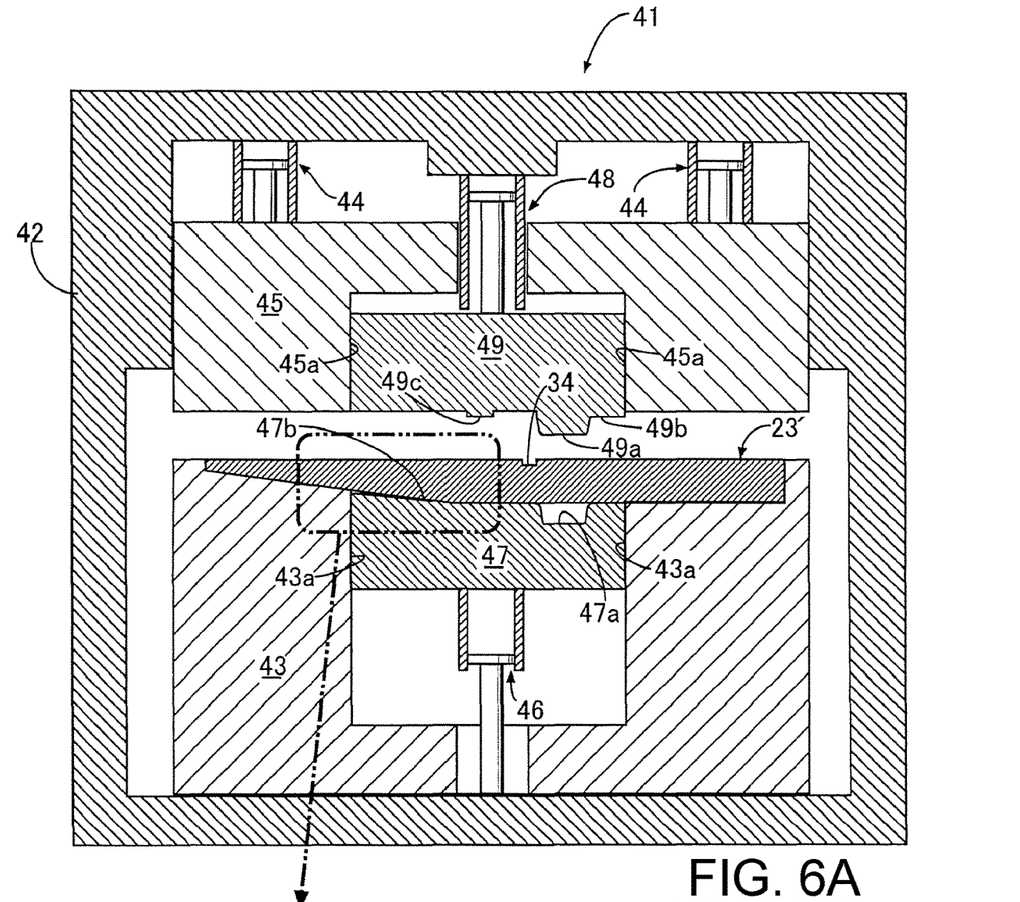
FIGS. 6A and 6B are cross-sectional views of a punching apparatus and the metal element raw material (first embodiment).
Figure 6B:
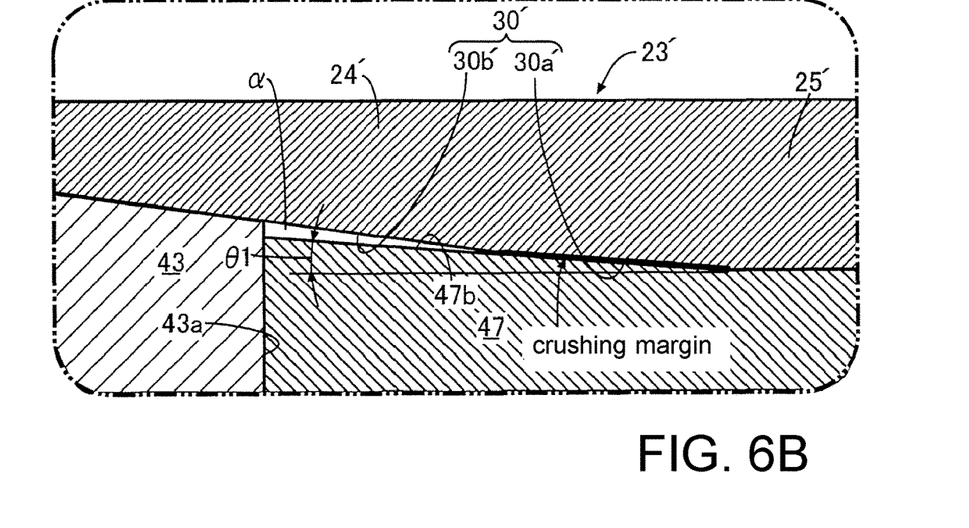

As illustrated in FIGS. 6A and 6B, the punching apparatus 41 which punches the metal element 23 out of the metal element raw material 23' includes a lower die 43 which is fixed to a lower portion of a frame body 42; an upper die 45 which is supported by an upper portion of the frame body 42 and is driven by a die driving cylinder 44 such that the upper die 45 can be lifted and lowered; a counter punch 47 which is fitted into a recess portion 43a open on the upper surface formed in the lower die 43 and is driven by a counter punch driving cylinder 46 such that the counter punch 47 is lifted and lowered; and a main punch 49 which is fitted into a recess portion 45a open on the lower surface formed in the upper die 45 and is driven by a main punch driving cylinder 48 such that the main punch 49 is lifted and lowered.

The contour shapes of the counter punch 47 and the main punch 49 are the same as the contour shape of the metal element 23. A nose forming portion 47a for forming the nose 32 of the metal element 23, and a first inclined surface forming portion 47b for forming the first inclined surface 30a of the metal element 23 are formed in the counter punch 47. A hole forming portion 49a for forming the hole 33 of the metal element 23, a first recess portion forming portion 49b for forming the first recess portion 26a of the ear portion 26 of the metal element 23, and a third recess portion forming portion 49c for forming the third recess portion 24a of the body portion 24 of the metal element 23 are formed in the main punch 49.

The first inclined surface forming portion 47b of the counter punch 47 is parallel to the first inclined surface corresponding portion 30a' of the inclined surface corresponding portion 30' of the metal element raw material 23'.

Both the first inclined surface forming portion 47b and the first inclined surface corresponding portion 30a' incline at the first inclination angle θ1. Therefore, there is a gap a between the first inclined surface forming portion 47b and a second inclined surface corresponding portion 30b' of the inclined surface corresponding portion 30' of the metal element raw material 23'.

Next, an operation effect achieved due to the shape of the metal element 23 having the above-described configuration will be described.

The metal belt 15 wound around the drive pulley 13 and the driven pulley 14 transmits a driving force by a pushing force of a chord portion on a driving force transmitting side extending from the drive pulley 13 toward the driven pulley 14. The metal elements 23 are aligned substantially parallel to each other in the chord portion on the driving force transmitting side. In contrast, in a winding portion in which the metal belt 15 is wound around the pulleys 13 and 14, the metal element 23 changes its posture radially about the axial line of the pulleys 13 and 14. Therefore, a space between the outer ends of adjacent metal elements 23 in the radial direction is widened, and a space between the inner ends of the metal elements 23 in the radial direction is narrowed such that the metal elements 23 oscillate relatively to each other. In this case, the locking edge 29 of the metal element 23 on the rear side coming into contact with the rear surface of the metal element 23 on the front side becomes a fulcrum, and the metal elements 23 in the front and the rear are caused to relatively pitch (oscillate in the forward-rearward direction) within a range of the gap between the nose 32 and the hole 33, so that the posture is allowed to be changed.

Figure 10:
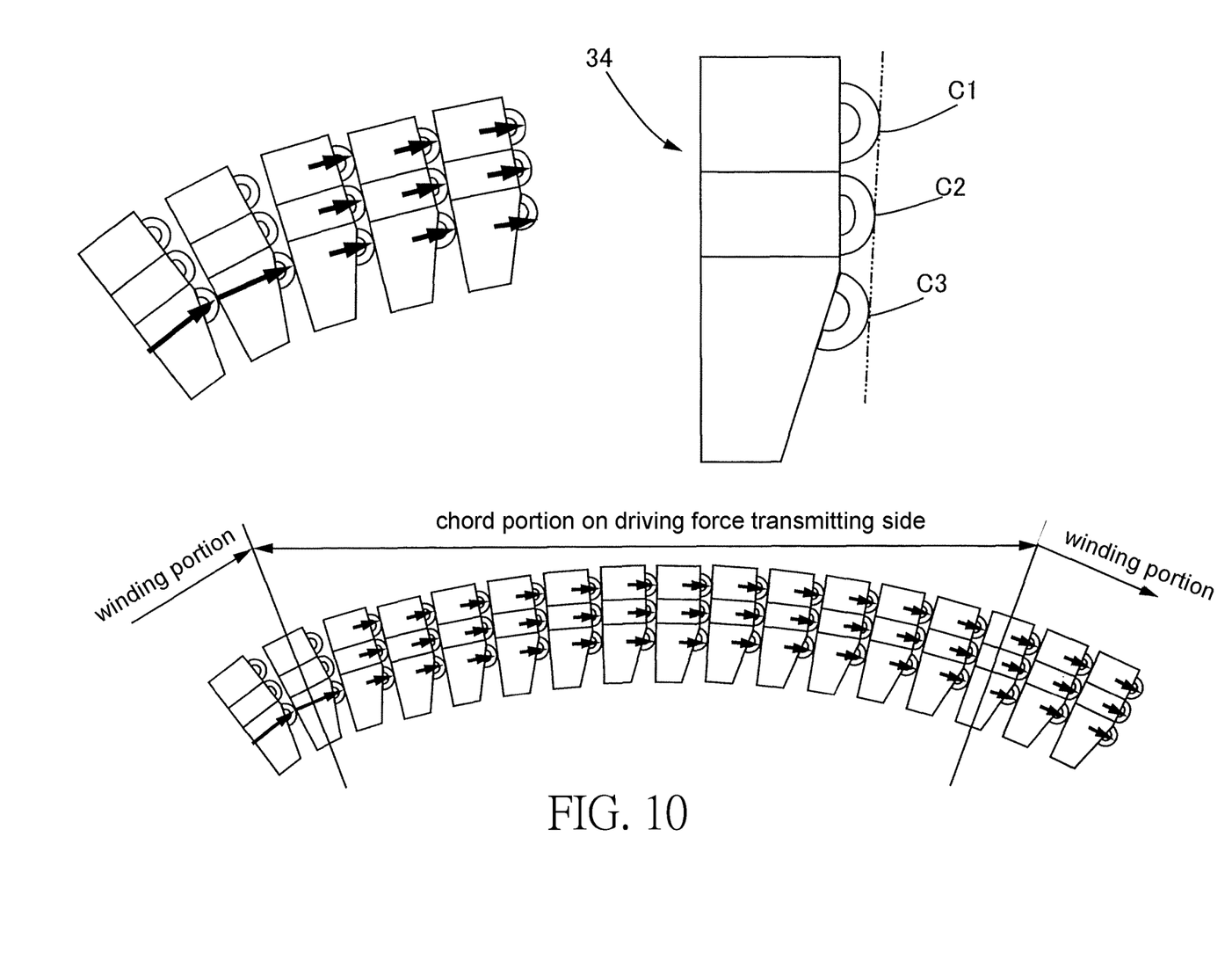
FIG. 10 is a view describing behavior of the metal element in a chord portion on a driving force transmitting side (first embodiment).

When a number of metal elements 23 are in contact with each other in the chord portion of the metal belt 15 on the driving force transmitting side and a driving force is transmitted, the first contact portions C1 of the ear portion 26, the second contact portion C2 of the neck portion 25, and the third contact portion C3 of the body portion 24 on the rear surface of the metal element 23 on the front side come into contact with the front surface of the metal element 23 on the rear side. However, since the plate thickness of the metal element 23 is set in a manner of the plate thickness t1 of the first contact portions C1>the plate thickness t2 of the second contact portion C2>the plate thickness t3 of the third contact portion C3, as illustrated in FIG. 10, all the first to third contact portions C1 to C3 come into contact with the front surface of an adjacent metal element 23 in a substantially even manner without being separated from the front surface, so that a stable contact state is maintained.

In this case, as disclosed in Patent Document 1, when the plate thickness t2 of the second contact portion C2 is greater than the plate thickness t1 of each first contact portion C1 and the plate thickness t3 of the third contact portion C3, as illustrated in FIG. 13, the second contact portion C2 becomes a fulcrum and the metal element 23 pitches in a front-up manner or in a front-down manner. Therefore, the rigidity of the chord portion of the metal belt 15 on the driving force transmitting side deteriorates, thereby resulting in deterioration of the efficiency of transmitting power. As described above, according to the present embodiment, it is possible to suppress pitching of the metal element 23 in the chord portion of the metal belt 15 on the driving force transmitting side and to avoid deterioration of the efficiency of transmitting power. Moreover, since the plate thickness of the metal element 23 becomes slightly thick radially outward and becomes slightly thin radially inward, the chord portion of the metal belt 15 on the driving force transmitting side is slightly curved radially outward, so that a stable posture can be maintained.

Next, an operation effect in a manufacturing step of the metal element 23 will be described.

Figure 7A:
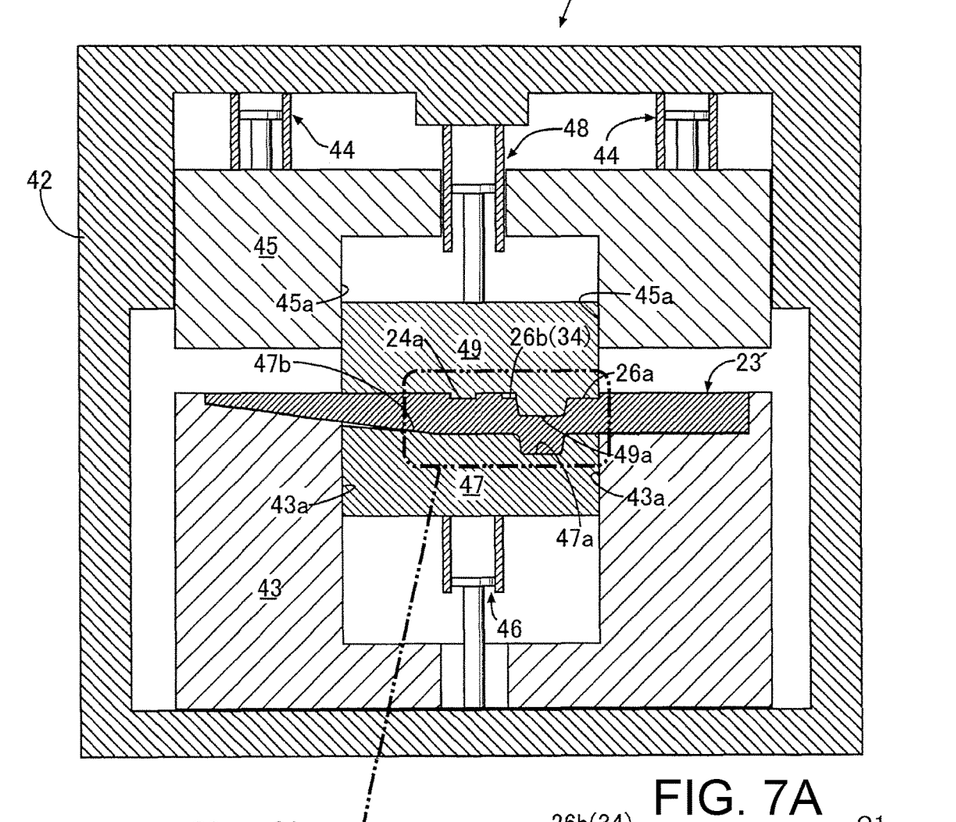
FIGS. 7A and 7B are views describing an operation corresponding to FIGS. 6A and 6B (first embodiment).
Figure 7B:
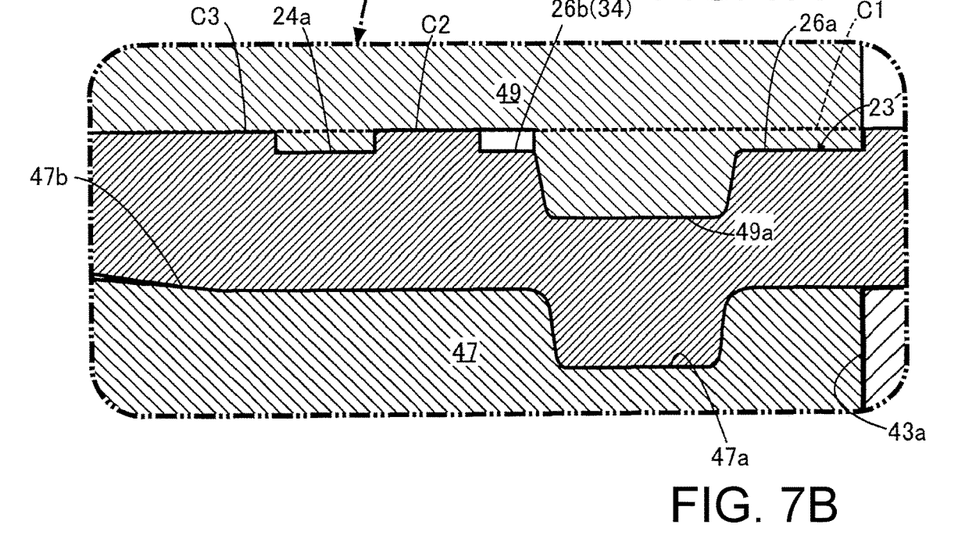

As illustrated in FIGS. 6A and 6B, the metal element raw material 23' manufactured in advance is placed on the lower die 43 and the counter punch 47 of the punching apparatus 41. Subsequently, as illustrated in FIGS. 7A and 7B, the upper die 45 is lowered by the die driving cylinder 44, and the metal element raw material 23' is caused to be interposed between the lower die 43 and the upper die 45 and is fixed therein. Thereafter, the main punch 49 is lowered by the main punch driving cylinder 48, and the metal element raw material 23' is interposed between the counter punch 47 and the main punch 49, thereby performing pressing.

As a result, the nose 32 and the hole 33 of the metal element 23 are formed by the nose forming portion 47a of the counter punch 47 and the hole forming portion 49a of the main punch 49. The first inclined surface 30a (that is, the first inclined surface corresponding portion 30a' of the metal element raw material 23') of the metal element 23 is formed by the first inclined surface forming portion 47b of the counter punch 47. The first recess portion 26a of the metal element 23 is formed by the first recess portion forming portion 49b of the main punch 49, and the third recess portion 24a of the metal element 23 is formed by the third recess portion forming portion 49c. In this case, the second recess portion 26b of the ear portion 26 of the metal element 23 is not pressed by the main punch 49, and the second recess portion 26b is formed as a part of the raw material recess portion 34 of the metal element raw material 23' which has been formed in advance.

Figure 8:
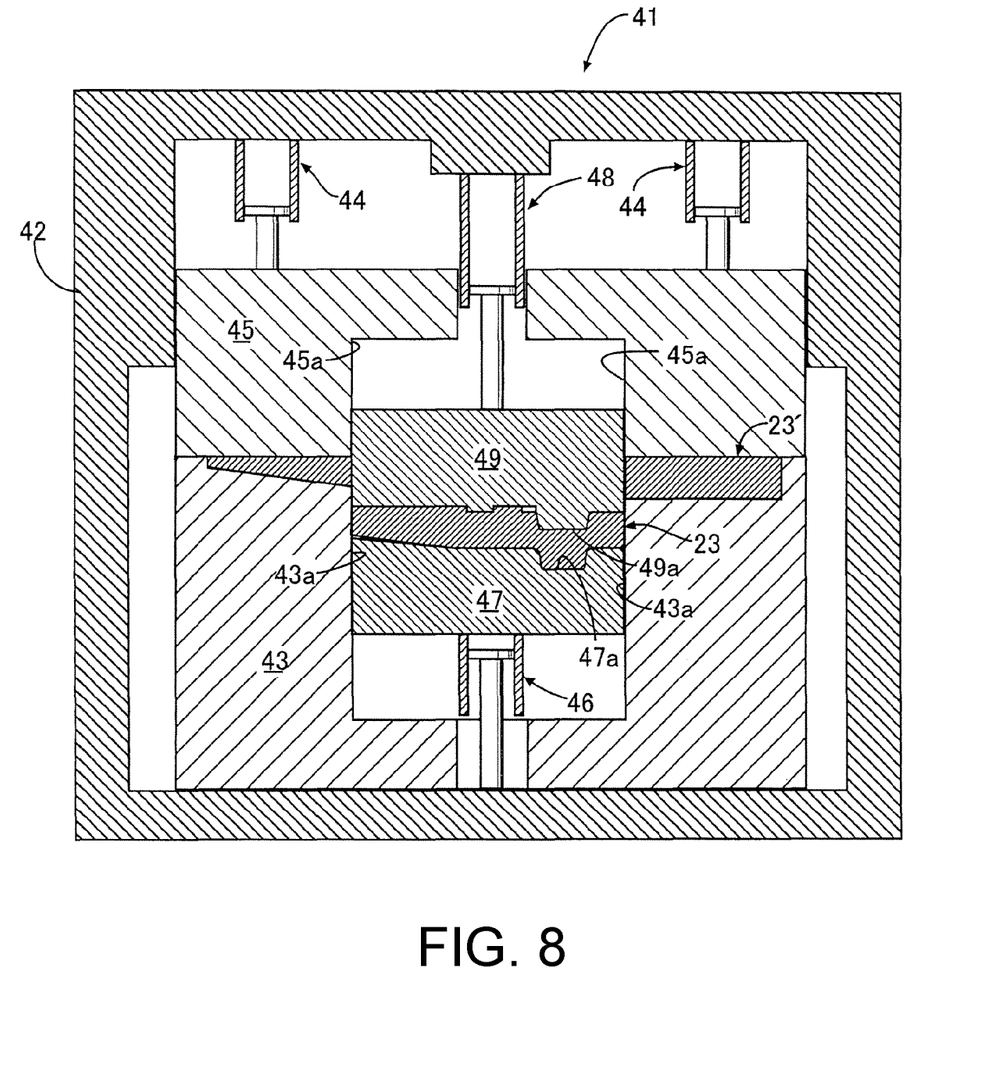
FIG. 8 is another view describing an operation corresponding to FIGS. 6A and 6B (first embodiment).

When press-forming of the metal element 23 is completed in this manner, as illustrated in FIG. 8, the counter punch 47 and the main punch 49 are relatively lowered with respect to the lower die 43 and the upper die 45 by the counter punch driving cylinder 46 and the main punch driving cylinder 48, and the metal element 23 is punched out of the metal element raw material 23'.

Figure 9A:
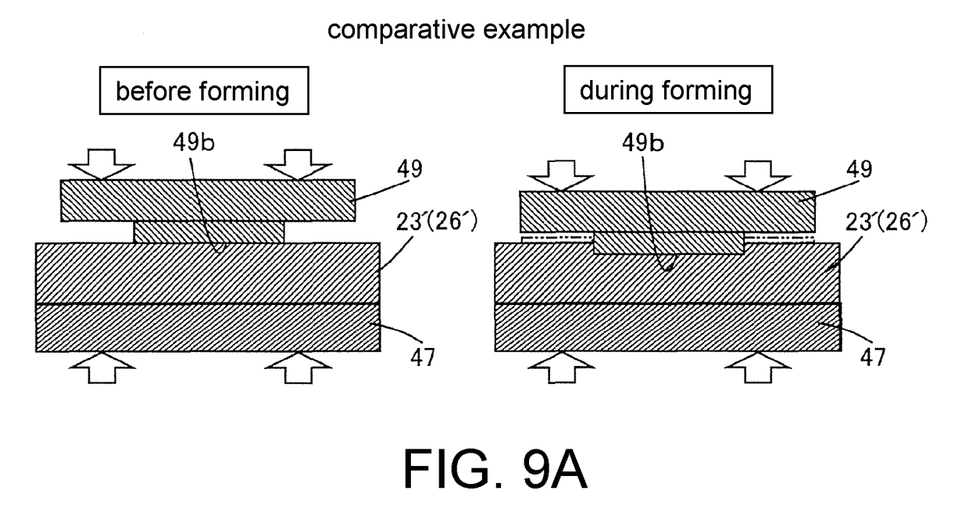
FIGS. 9A and 9B are schematic views describing operations of a comparative example and the embodiment when press-forming is performed.
Figure 9B:
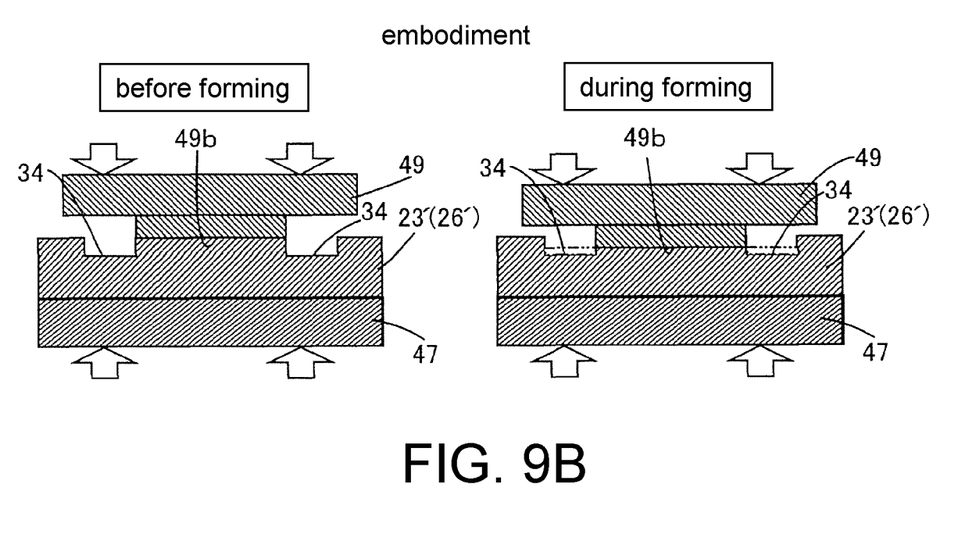

FIGS. 9A and 9B schematically illustrate operations when the metal element 23 is subjected to pressing. FIGS. 9A and 9B correspond to the cross-sectional view taken along line 4-4 of the metal element 23 illustrated in FIG. 3. FIG. 9A illustrates a comparative example corresponding to a case in which the metal element raw material 23' has no raw material recess portion 34. When the first recess portion 26a of the ear portion 26 is pressed by the first recess portion forming portion 49b of the main punch 49, the material thereof is pushed out to the periphery of the first recess portion 26a. Therefore, a significant press load is required to additionally press the pushed out material and to finish the first contact portions C1 with predetermined plate thicknesses.

Meanwhile, FIG. 9B illustrates the present embodiment in which the metal element raw material 23' has the raw material recess portion 34. A part of the material pushed out by the first recess portion forming portion 49b of the main punch 49 enters the raw material recess portion 34 of the metal element raw material 23', so that the press load for additionally pressing the pushed out material and finishing the first contact portions C1 and the second contact portion C2 with predetermined plate thicknesses is reduced. Thus, the durability of the punching apparatus 41 is improved.

Second Embodiment

Figure 11:
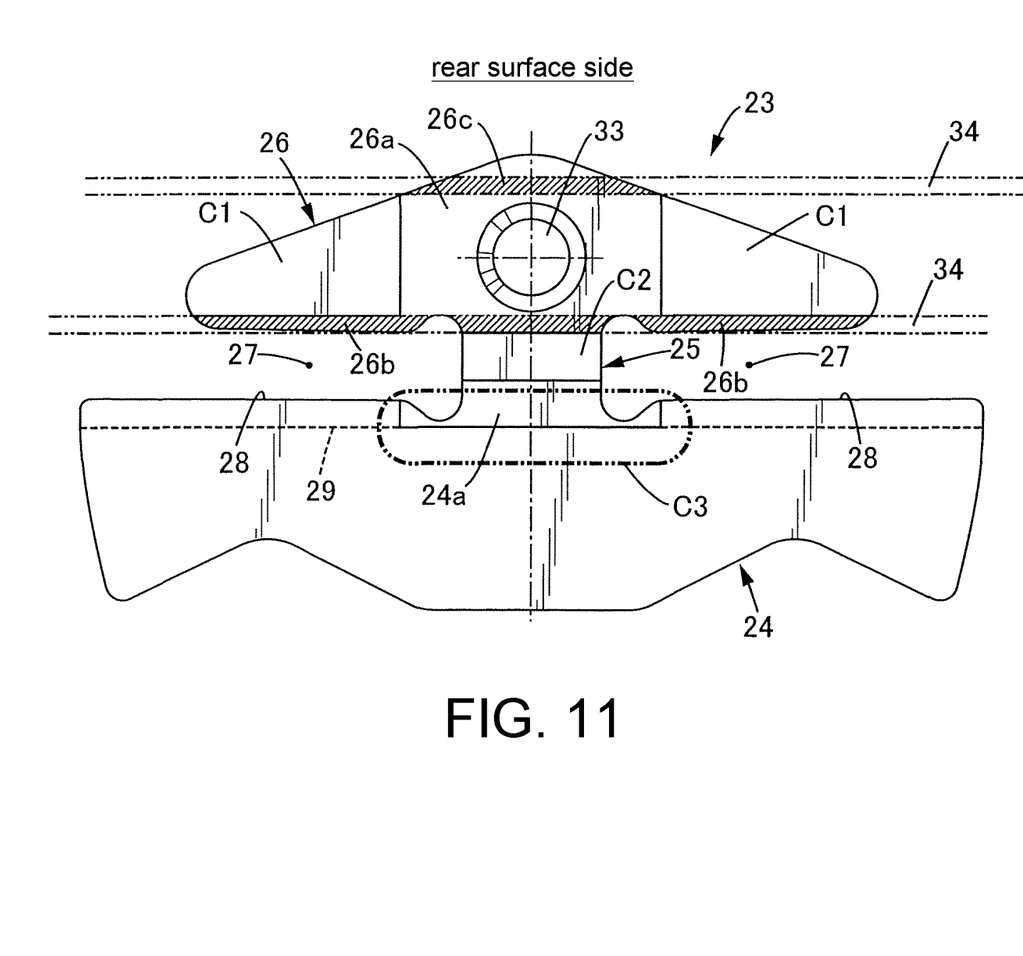
FIG. 11 is a view corresponding to FIG. 3 (second embodiment).

Next, a second embodiment of the present invention will be described based on FIG. 11.

The first embodiment includes the second recess portion 26b for allowing a material at the time of pressing to escape along the inner end of the ear portion 26 of the metal element 23 in the radial direction. However, in the second embodiment, in addition to the second recess portion 26b, a fourth recess portion 26c for allowing a material at the time of pressing to escape is provided at the outer end of the ear portion 26 in the radial direction, as a part of the first recess portion 26a. Since both the second recess portion 26b and the fourth recess portion 26c are provided, the press load can be further reduced. The fourth recess portion 26c is similar to the second recess portion 26b in that the fourth recess portion 26c is not formed through pressing but is formed by a raw material recess portion which has been formed in advance in the metal element raw material 23'.

Third Embodiment

Figure 12:
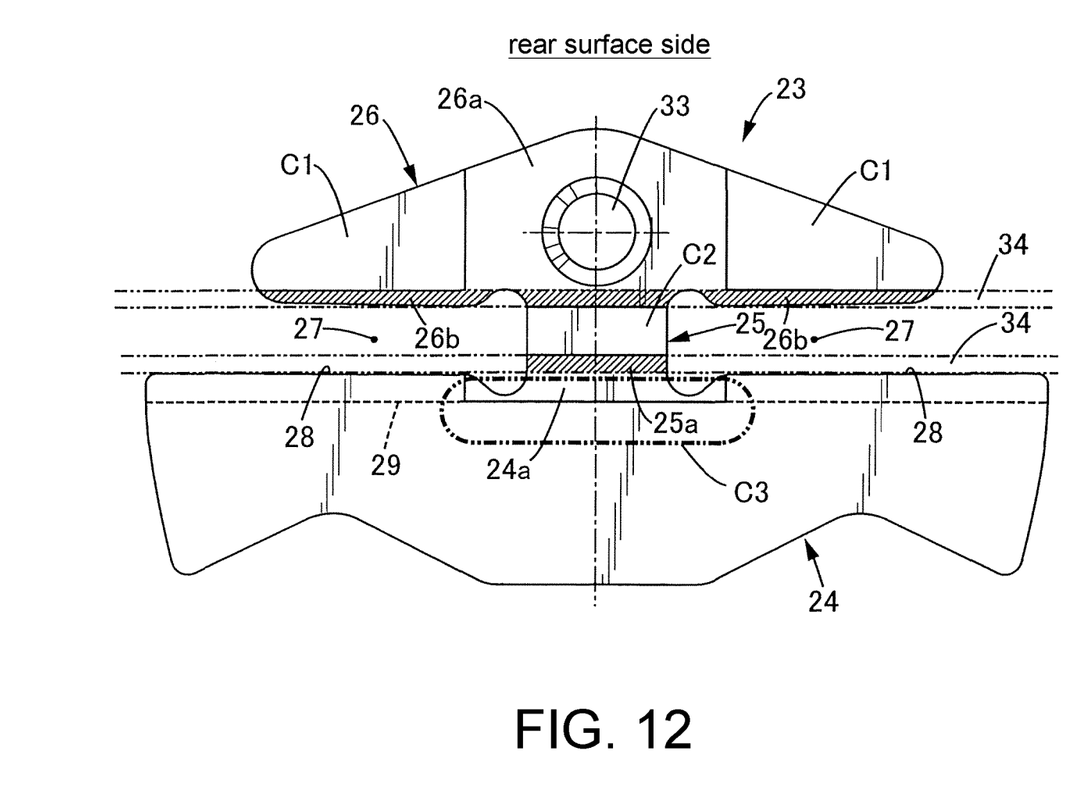
FIG. 12 is a view corresponding to FIG. 3 (third embodiment).

Next, a third embodiment of the present invention will be described based on FIG. 12.

The first embodiment includes the second recess portion 26b for allowing a material at the time of pressing to escape along the inner end of the ear portion 26 of the metal element 23 in the radial direction. However, in the third embodiment, in addition to the second recess portion 26b, a fifth recess portion 25a for allowing a material at the time of pressing by the third recess portion forming portion 49c to escape is provided at the inner end of the neck portion 25 in the radial direction. Accordingly, the press load can be further reduced. The fifth recess portion 25a is similar to the second recess portion 26b in that the fifth recess portion 25a is not formed through pressing but is configured by a raw material recess portion which has been formed in advance in the metal element raw material 23'.

Hereinabove, the embodiments of the present invention are described. The present invention can be subjected to various design changes within the scope not departing from the gist thereof.

What is claimed is:

1. A metal element for a continuously variable transmission including a metal belt (15) comprising a pair of metal rings (22) for supporting a plurality of the metal elements (23) in the continuously variable transmission, the metal element comprising:
    a pair of right and left ring slots (27) into which the pair of metal rings (22) are fitted;
    a neck portion (25) which is positioned between the pair of ring slots (27);
    an ear portion (26) which extends radially outward from the neck portion (25); and
    a body portion (24) which extends radially inward from the neck portion (25) and has saddle surfaces (28) being formed to support inner circumferential surfaces of the metal rings (22),
    wherein a locking edge (29) extending in a transverse direction and an inclined surface (30) extending radially inward and rearward from the locking edge (29) are formed on a front surface of the body portion (24),
    wherein a rear surface of the metal element (23) includes a pair of first right and left contact portions (C1) which are respectively formed on both right and left end sides of the ear portion (26), a second contact portion (C2) which is formed in the neck portion (25), and a third contact portion (C3) formed in a central portion in the transverse direction in the vicinity of the locking edge (29) of the body portion (24),
    wherein the first contact portions (C1), the second contact portion (C2), and the third contact portion (C3) are able to come into contact with a front surface of another adjacent metal element (23) on a rear side in a chord portion of the metal belt (15) on a driving force transmitting side, and
    wherein a plate thickness of the metal element (23) in the second contact portion (C2) is smaller than the plate thickness of the metal element (23) in the first contact portions (C1) and is greater than the plate thickness of the metal element (23) in the third contact portion (C3).

2. A method of manufacturing a metal element for a continuously variable transmission, in which the metal element (23) according to claim 1 is manufactured through pressing of a belt plate-shaped metal element raw material (23') having a constant cross section by dies (47, 49),
    wherein a first recess portion (26a) which is formed through pressing is provided in a central portion of the ear portion (26) surrounded by the pair of first right and left contact portions (C1) and the second contact portion (C2) on the rear surface of the metal element (23), and a second recess portion (26b) which is configured by a groove-shaped raw material recess portion (34) formed in the metal element raw material (23') in advance is provided in an inner end portion of the ear portion (26) in a radial direction.

* * * * *